Z. J. WHITE.
POTATO CUTTER AND DROPPER AND CORN-PLANTER.
No. 192,316. Patented June 19, 1877.
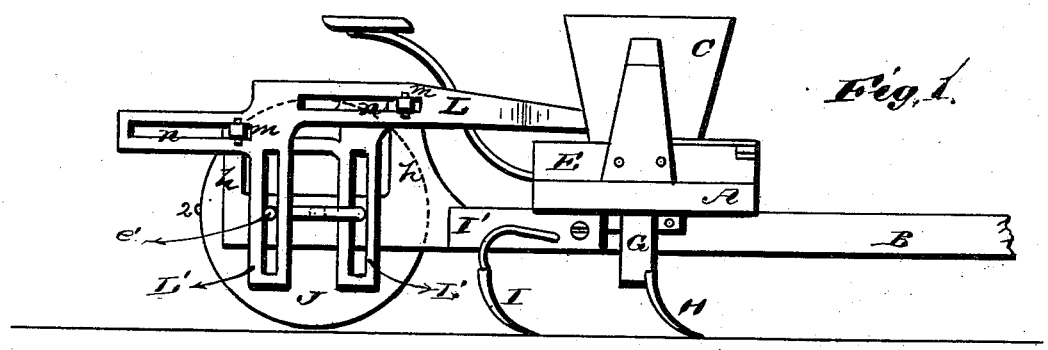
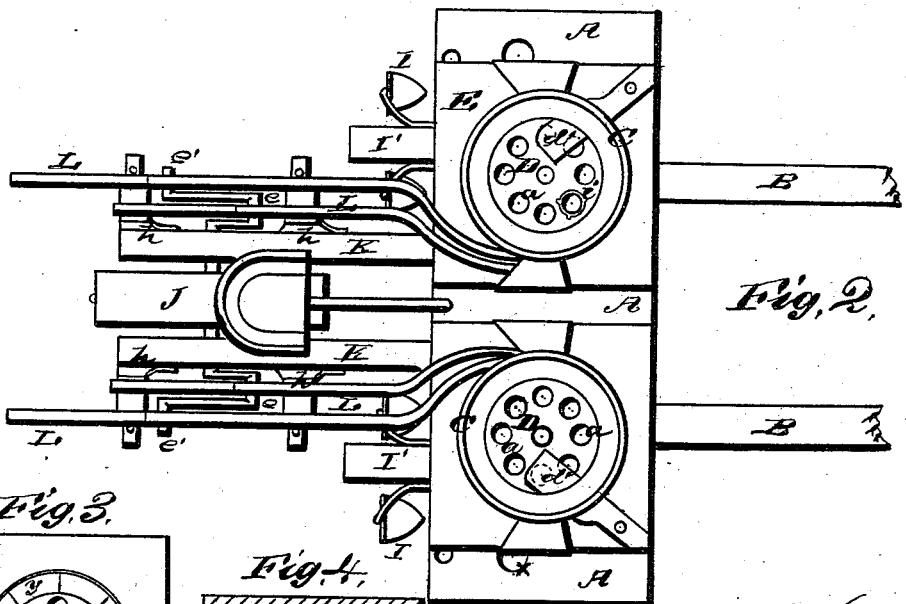
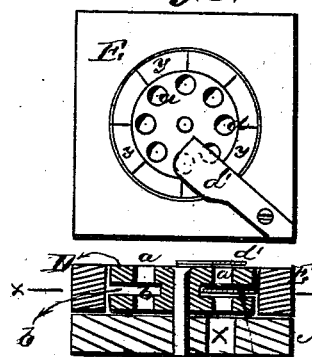
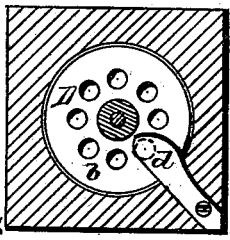
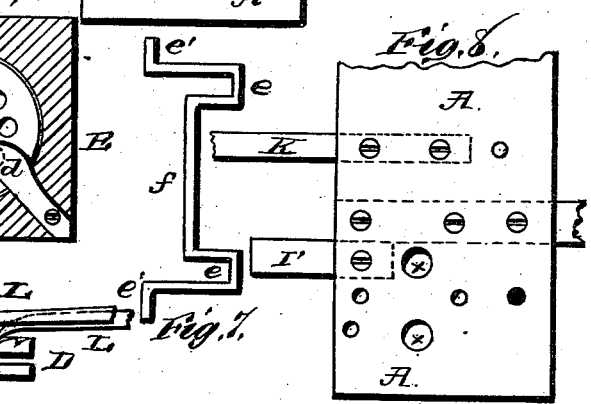
WITNESSES
INVENTOR
Zachariah J. White
ATTORNEYS.

UNITED STATES PATENT OFFICE.

ZACHARIAH J. WHITE, OF BLANCHESTER, OHIO.

IMPROVEMENT IN POTATO CUTTER AND DROPPER AND CORN-PLANTER.

Specification forming part of Letters Patent No. 192,316, dated June 19, 1877; application filed April 21, 1877.

*To all whom it may concern:*

Be it known that I, ZACHARIAH J. WHITE, of Blanchester, in the county of Clinton and State of Ohio, have invented a new and valuable Improvement in Potato Cutter, Dropper, and Corn-Planter; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side elevation of my potato cutter, dropper, and corn-planter. Fig. 2 is a plan view of the same, and Figs. 3, 4, 5, 6, 7, 8, are detail views.

The nature of my invention consists in the construction and arrangement of a potato cutter and dropper, which may also be used as a corn-planter, as will be hereinafter more fully set forth.

In the annexed drawing, which fully represents my invention, A represents the bed or platform, to which the shafts B B are attached. On the bed A are placed two hoppers, C C, the bottom of each formed of a rotating disk, D, surrounded by a frame, E, to which the hopper is secured, and which frame is fastened to the bed. In the disk D is a series of dropping-holes, *a*, arranged at equal distances apart in a circle concentric with the disk. In the disk is a circumferential groove, *b*, as shown in Fig. 5, extending inward beyond the dropping-holes *a*, and in this groove works a stationary knife, *d*, attached to the frame E. Immediately above the disk is another stationary knife, *d'*, also attached to the frame E. These knives are for the purpose of dividing the potatoes, and immediately after the potatoes pass the knives they fall through a hole, *x*, in the bed.

When two or more pieces are to be dropped at one time, the lower knife *d* is made narrow, so as not to cover the hole *x* in the bed; but, if the lower knife is made wide enough to cover said hole, only one piece will be dropped each time, as the piece that the upper knife *d'* cuts will pass over said hole and then drop down in the bottom of the hole *a*, while the piece that the lower knife cuts off will pass through to the hill, said piece passing through a conductor, G, which has a furrow-opener, H, attached to its lower end.

The distance between the rows can be regulated by changing the hoppers out or in, there being two or more holes *x* in the bed for each hopper, as shown in Fig. 8.

And the holes *a* in the disks D can be made smaller to suit small potatoes by fastening a ring, *i*, in each hole, as seen in Fig. 2.

I I represent coverers attached to a small beam, I', projecting from the under side of the bed in rear of the conductor G.

The disks D D are rotated by the following means:

From the under side of the bed A, between the two hoppers, project two parallel beams, K K, a suitable distance to the rear; and between said beams is mounted a wheel, J, on a shaft, *f*, having a double crank, *e e'*, at each end.

On the two cranks *e e'* at each end of the shaft *f* are placed vertically-slotted arms L' L' projecting downward from two dogs, L L, which are provided with longitudinal slots *n n*, and ride on pins *m m* projecting from standards *h* attached to the beams K.

The front ends of the dogs L are curved, substantially as shown in Fig. 2, and work in ratchets *y* formed in the upper surfaces of the disks D around the periphery, so that, by the revolution of the wheel J, said disks will be rotated around their respective center pivots.

For making hills, only one dog is used for each disk, and, for doubling the number of hills, both dogs are used, so that for each revolution of the wheel J one or two hills may be made, according to the number of dogs used.

On the wheel J is a point, 2, which may be used as a marker to keep the rows in line or guide for the dropping.

This machine may be used as a corn-planter by removing the hoppers, disks, and knives now thereon, and substituting therefor other hoppers, with disks without knives.

What I claim as new, and desire to secure by Letters Patent, is—

1. In a potato-dropper, the rotating dropping-disk D with circumferential groove *b*, and the stationary knives $d$ $d'$ combined therewith, substantially as and for the purpose described.

2. The combination of the grooved rotating dropping-disk D, stationary knives $d$ $d'$, bed A with dropping-holes $x$, conductor G with furrow-opener H, and coverers I, substantially as and for the purpose described.

3. In combination with the rotating dropping-disks D D, the center-wheel J, rod $f$ with double crank at each end, the longitudinal slotted dogs L with vertically-slotted arms L', and stationary guide-pins $m$, all substantially as and for the purpose described.

In testimony that I claim the above I have hereunto subscribed my name in the presence of two witnesses.

ZACHARIAH J. WHITE.

Witnesses:
   JOHN FRAZEE,
   D. C. CARROLSON.